United States Patent
Nurmi et al.

(10) Patent No.: US 6,206,977 B1
(45) Date of Patent: *Mar. 27, 2001

(54) METHOD FOR CRYSTALLIZING ANHYDROUS FRUCTOSE FROM ITS AQUEOUS SOLUTIONS

(75) Inventors: Juha Nurmi, Pinjainen; Heikki Heikkila, Espoo, both of (FI)

(73) Assignee: Danisco Finland Oy, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/825,927

(22) Filed: Jan. 27, 1992

(51) Int. Cl.[7] ............................. B01D 9/00; C13F 1/00; C13F 1/02
(52) U.S. Cl. .......................... 127/15; 127/16; 127/58; 127/60
(58) Field of Search ................. 127/58, 60, 16, 127/15

(56) References Cited

U.S. PATENT DOCUMENTS

| | | | |
|---|---|---|---|
| 1,653,712 | * 12/1927 | Lafeuille | 127/16 |
| 3,513,023 | * 5/1970 | Kusch et al. | 127/58 |
| 3,883,365 | * 5/1975 | Forsberg et al. | 127/30 |
| 3,928,062 | * 12/1975 | Yamauchi | 127/61 |
| 4,486,395 | * 12/1984 | Witte et al. | 127/16 |

FOREIGN PATENT DOCUMENTS

1190243 * 4/1968 (GB).

* cited by examiner

Primary Examiner—Mark L. Bell
Assistant Examiner—Patricia L. Hailey
(74) Attorney, Agent, or Firm—Scully, Scott, Murphy & Presser (57) ABSTRACT

Methods of crystallizing anhydrous fructose from aqueous solutions using a large scale crystallizer are provided. The various crystallization methods include at least a cooling crystallization step wherein cooling is controlled so as to maintain a temperature difference between the solution and the cooling element of less than about 10° C., and maintain supersaturation of the aqueous solution with respect to the saturated fructose at a ratio between 1.1 and 1.25, whereby optimum heat transfer and a fructose crystal growth rate of at least 0.008 mm/hr is achieved with little or no spontaneous crystal nucleation.

25 Claims, 3 Drawing Sheets

METHOD FOR CRYSTALLIZING ANHYDROUS FRUCTOSE FROM ITS AQUEOUS SOLUTIONS

FIELD OF THE INVENTION

This invention relates to the production of crystalline fructose. More specifically, it provides a method for large scale, high capacity, high yield production of crystalline fructose through the use of a crystallizer with optimal heat and mass transfer properties.

BACKGROUND OF THE INVENTION

The present invention relates to an improved method for crystallizing anhydrous fructose crystals from water solution. Disclosed herein is an economic method for producing large scale, high yields of crystalline fructose. Crystalline fructose is generally obtained by seeding supersaturated fructose solutions to induce crystalline growth. Due to the solubility and stability characteristics of fructose and high viscosity of fructose solutions, however, it is often problematic to maintain the optimum conditions to insure the economic production of a pure crystalline product.

Fructose is very soluble in water and the solutions are extremely viscous. A large amount of heat due to high crystallization heat of fructose, mixing heat and additional cooling of the mass must be removed during fructose crystallization. In addition, because fructose has a very narrow metastable zone, the temperature difference between the solution and the cooling surface must be quite low thus making the crystallization very difficult.

To overcome this difficulty, several prior art processes involve the use of organic solvents to crystallize fructose from aqueous solutions. In Finnish Patent Application No. 862025, for example, a continuous fructose crystallization method using organic solvents is described. The viscosity of the fructose solution, however, results in a lowering of productivity, thus the yield is only about 40% and the productivity about 0.17 $t/m^3/d$ even if the mass is pumped through a vertical crystallizer. The productivity ($t/m^3/d$) is defined as the production rate of crystals (metric tons) per the total volume of the crystallizer (cubic meter).

Crystallization from an organic solvent or water solvent mixture is also described in Staley's European patent 015617. The use of organic solvents, however, creates disadvantages with large scale crystallizations. These include fire hazards as well as the fact that solvents are toxic and therefore unsuitable because small residues remaining in the crystalline product will leave it unsuitable for use in foods.

Several methods have been developed which avoid the use of organic solvents in the fructose crystallization process, but these methods are often disadvantageous economically because of the high viscosity and unstable nature of supersaturated fructose solutions. UK Patent Application 2172288A teaches a method for the continuous crystallization of fructose from an aqueous solution. The syrup is rapidly mixed with seed and put onto a surface until a cake is formed, which is then comminuted to a free flowing granular product. Although this method avoids the problem of continuous handling of viscous solutions, the granular amorphous product contains all of the impurities that were in the feed syrup. In addition, the extra grinding and drying stages raise the operation costs considerably. Similar costs are incurred using the method described in U.S. Pat. No. 4,199,373, wherein syrup is seeded with crystalline fructose and allowed to stand in a mold or container, after which the crystalline material is recovered, dried, and ground.

Several patents describe processes wherein fructose is allowed to selectively crystallize from an aqueous solution. In Japanese application 118,200, two towers, one for graining and one for crystallization are described. Feed from the first tower, containing 33–50% fructose syrup, is mixed with massecuite (crystal-containing) overflow from the second tower. The resultant mixture is cooled as the product moves downward in laminar flow. The crystalline fructose is then obtained by centrifugation. Although this process avoids the additional drying and grinding steps of other crystallization processes, its productivity is low and the scale up capacity is limited because of the necessity for vertical laminar flow and heat transfer demands.

One effective procedure for crystallization of fructose from aqueous solutions is described in U.S. Pat. No. 3,928,062.

The patent described a method wherein a supersaturated solution is seeded and then evaporated and/or cooled under moderate stirring while maintaining the concentration and temperature within certain ranges. By continuously concentrating the mother liquor, it can be used to produce multiple crops of fructose crystals. Although a suggestion is also made that cooling alone can be used, such a procedure is not considered as advantageous as those using continuous evaporation because the mother liquid must be reconcentrated at the start of each batch. Although such a procedure is useful for producing small batches of crystalline fructose, such a process could not be used in an industrial scale production due to heat transfer constraints as well as lack of adequate mixing and control of supersaturation.

According to U.S. Pat. No. 3,883,365, large fructose crystals are obtained in a two stage batch method from water solution by adjusting the pH of the solution and slowly cooling the mass to create a supersaturated solution which, when seeded, is optimal for crystal formation. Because of the long crystallization time of the process, a pH adjustment must be done and the productivity of the method is only about 0.25 $t/m^3/d$.

Although all of the above processes have been used successfully for the production of crystalline fructose, it has heretofore been thought to be impossible to produce crystalline fructose on a large scale with high yields, high capacity (productivity) and good purity from its aqueous solutions without resorting to costly processing steps including evaporating, drying, and grinding. An object of the present invention is to provide a cost effective method for large scale, high capacity production of fructose crystals in high yields.

Another object of the invention is to provide a method for crystallization of fructose which does not require the use of organic solvents and without the need of pH adjustment.

Still another object of the invention is to provide a crystallizing apparatus that has optimal heat transfer and mixing capacities for large scale production of high purity fructose crystals.

Further objects will be evident from the description of the invention which follows.

SUMMARY OF THE INVENTION

Disclosed herein is a method for producing crystalline anhydrous fructose whereby a small amount of crystalline fructose, providing a nucleation site, is added to a fructose solution or crystalline seeds are allowed to form spontaneously in the solution. In a multistage crystallization process, all stages except the first are seeded with a crystal foot, which is a mass of crystals and mother liquid (massecuite)

from a previous crystallization. The resulting mixture is mixed while cooling slowly to carefully maintain the temperature and degree of saturation for anhydrous crystallization.

In the production of fructose crystals, low supersaturation and a small differential temperature should be maintained. In a preferred embodiment, the temperature differential between the solution and the means used for cooling the solution is less than about 10° C., preferably less than about 6° C., and the fructose solution, although supersaturated, has a supersaturation of no more than 1.25, preferably between 1.1 and 1.2. Such conditions can most readily be controlled in a heat transfer apparatus or crystallizer whereby a heat transfer surface of at least about 5 m$^2$/m$^3$ is provided. When such a crystallizer is used, it is not inclined more than 45 degrees, and it contains means for effective mixing, as well as cooling elements (such as plates or tubes) optimally spaced about 200 to 400 mm apart and having an open sector in the cooling plates of at least 5 degrees along the crystallizer.

In this embodiment, the mixer blades are located in between and not more than 30 mm from the cooling surfaces.

Preferably, the velocity of the mixer blades is at least about 50 mm/sec during the crystallization process.

DETAILED DESCRIPTION OF THE INVENTION

A. Process in General

According to the present invention it has now been found that it is possible to improve fructose crystallization from water solution by a method where a horizontal cylindrical crystallizer is used both to allow efficient heat transfer within a small temperature differential and to effectuate good mixing of the mass. Although it is not intended to be a limitation to the invention, it is believed that the parameters described herein are adapted to create a dynamic equilibrium between crystalline anhydrous fructose and dissolved fructose such that the growth of the crystalline structure is fast, however, entrapment of water molecules is avoided.

The crystallization is carried out by seeding a saturated or supersaturated fructose solution with a proper amount of seed crystals or allowing the solution to form seeds spontaneously, and then cooling the massecuite according to a gradient which is determined during the crystallization. In a multistage crystallization process the stages from second to final crystallization are seeded with the proper amount of crystalline foot. The proper amount of seeding crystals ($M_S$) depends on their size ($d_S$), on the quantity of the finished crystals (M), and the desired crystal size (D) as follows:

$M^S$ (tons)=$(d_S/D)^3 \times M$ (tons)

The fructose mass is simultaneously mixed to ensure optimum heat transfer and maximum crystal growth rate within the mass. The crystallizing process is a batch process, but it can be made semi-continuous by interconnection of several similar crystallizers. A two-stage method is advantageous if large crystal size of the product is preferable. The cooling program depends on the quality of the feed syrup, but the productivity is typically 0.5–0.8 t/m$^3$/d and cooling time is typically 15–30 hours by this improved method.

A crystal yield of 65% of dry substance can be reached in the end of the crystallization. The recovery and drying of the crystals are made by conventional methods. If the yield is very high, air bubbles can be mixed, at no more than 20%, into the mass before the crystals are separated from the mother liquor to reduce the viscosity. This makes the centrifuging easier. The size of the product is typically 0.4–0.6 mm and the purity is over 99.5%.

B. Crystallizer

It is through the use of a crystallizer that the conditions of supersaturation and optimal cooling, mixing, and mass transfer can be accomplished in a large scale manner. For large scale production of fructose, the crystallizer is about 10 to 50 m$^3$ in size.

With reference to the drawings, there are shown crystallizers that are horizontal or inclined typically 5 degrees, but not more than 45 degrees, to ensure effective axial mixing and drainage of the system. In a crystallizer, the heat transfer surface must be at least about 5 m$^2$/m$^3$, so that the temperature difference between the fructose mass and cooling elements is not more than about 10° C., even if the cooling rate is 4° C./h.

Figure 1:
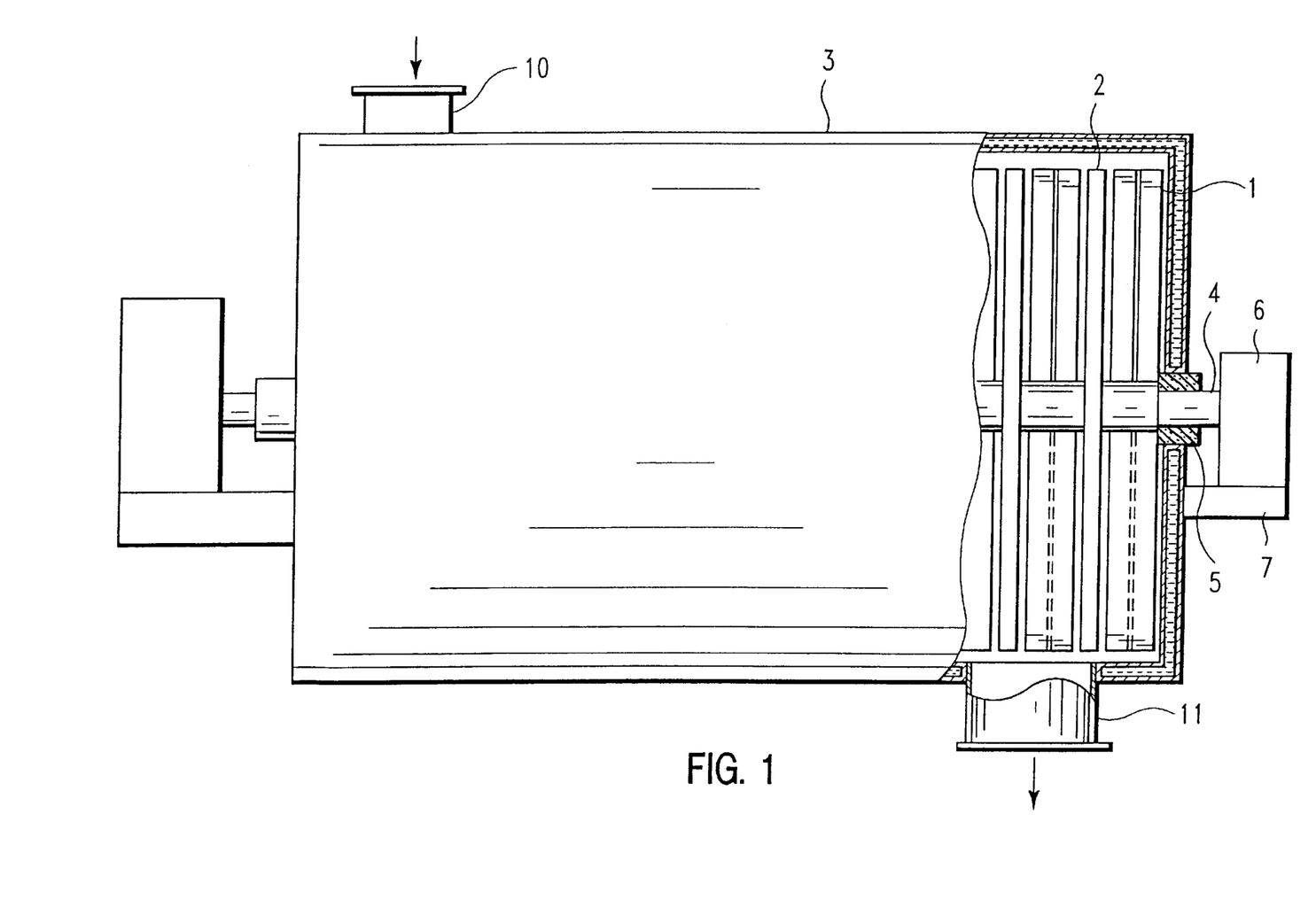
FIG. 1 is a side view, partially in cross section, of a fructose crystallizing apparatus according to the present invention.
Figure 1A:
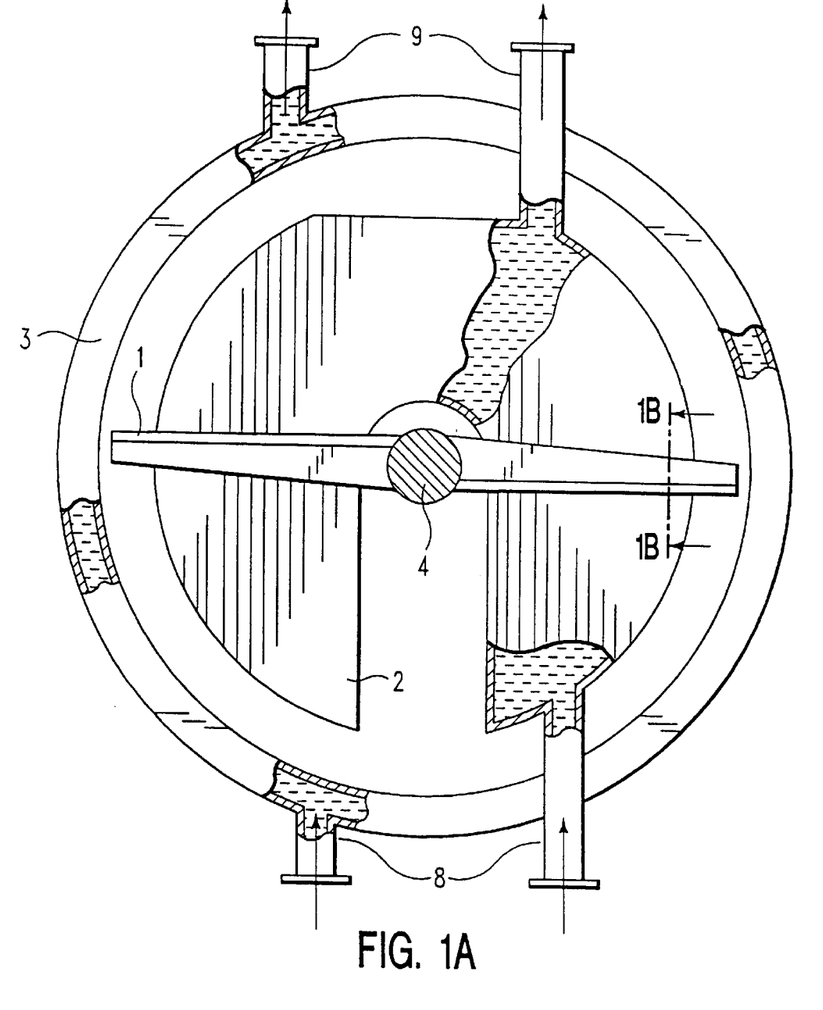
FIG. 1A is a right side elevated view, partially in cross section, of a crystallizing apparatus.
Figure 1B:
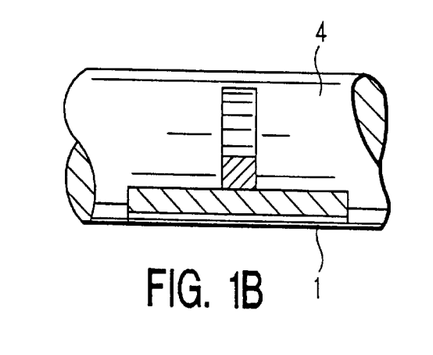
FIG. 1B is an enlarged partial section view of the crystallizer shown in FIG. 1A.

With reference to FIGS. 1, 1A and 1B, which depict an embodiment wherein multiple crystallizing zones are present, effective heat transfer is obtained when cooling water enters a cooling jacket 3 through an inlet 8 and circulates through cooling plates 2 which are situated inside the crystallizer and spaced about 200–400 mm apart. The cooling water passes through the cooling elements and out an outlet 9 located on the opposite end of the crystallizer from the water inlet.

A motor 6 mounted on a supporting stand 7 drives a shaft 4 which, at its point of entrance into the crystallizing apparatus is surrounded by a sealing material 5. Strong mixer blades 1 extend from-the shaft within the crystallizing apparatus. The mixing blades are situated between the cooling elements 2 so that the distance between the blades and the cooling elements are not more than about 30 mm to ensure proper mixing of the mother liquid near the crystal surfaces. The rotation speed of the mixer is such that the velocity of the top of the mixer blades is typically between about 100 and 300 mm/sec but not less than 50 mm/sec at any moment of the crystallization. Small mixing efficiency was found to be insufficient to keep the crystal growth rate high while too much mixing resulted in spontaneous crystal formation if supersaturation is high.

Fructose syrup to be crystallized (mother liquid) enters the crystallizer through inlet port 10. A horizontal flow in the crystallizer is effected by a small open sector in the cooling elements at least 5 degrees along the crystallizer. Massecuite containing solution is removed from the crystallizing apparatus through outlet 11 whereupon it is centrifuged to collect the crystalline material.

Figure 2:
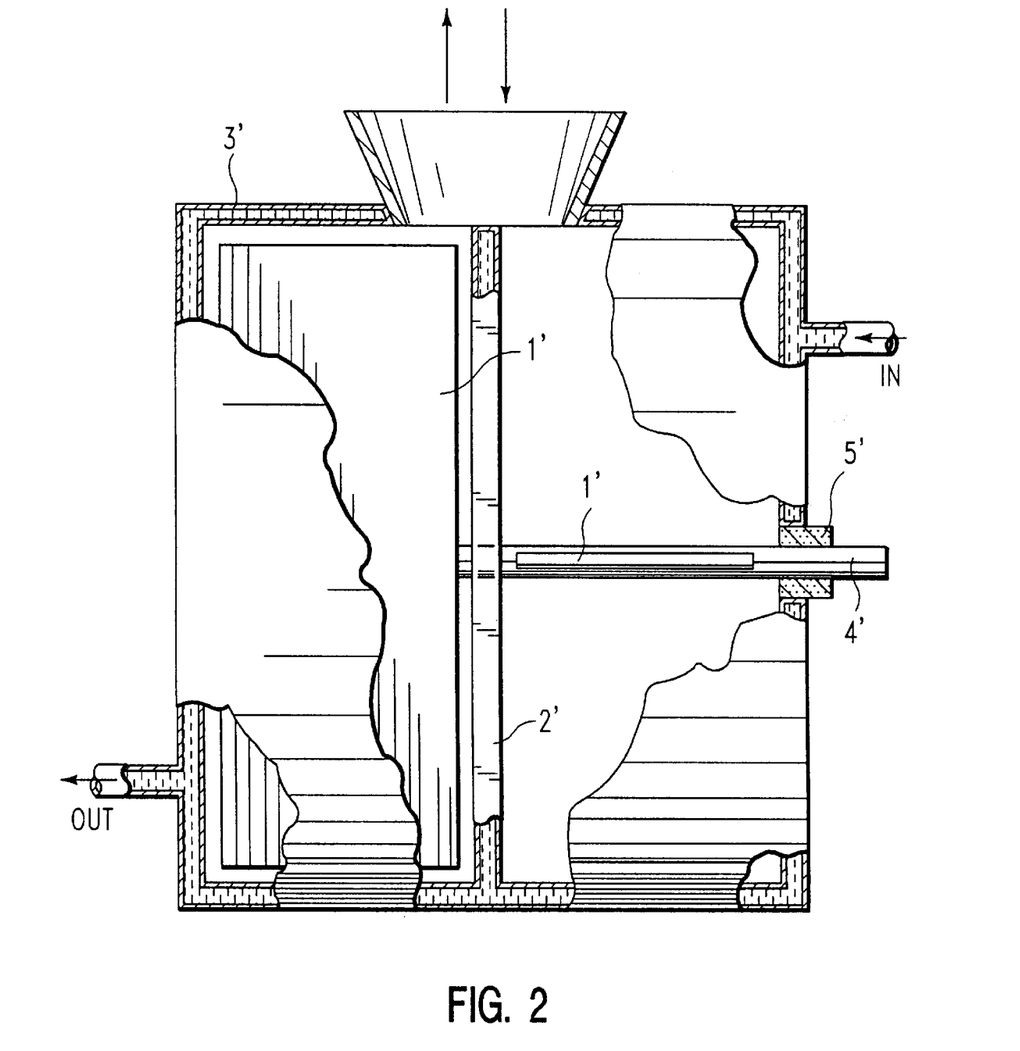
FIG. 2 is a side view, partially in cross section, of another embodiment of the invention.

Referring to FIG. 2, in another embodiment of the invention, the crystallizing apparatus may contain only two crystallizing zones. Such a crystallizer employs the same general components of the crystallizer shown in FIG. 1, but effective heat transfer is accomplished through circulation of cooling water through a cooling water jacket 3' and into a single cooling plate 2' which extends upward through the center of the apparatus. Similarly, only two mixing blades 1' are necessary for mixing of the crystallizing mixture. The motor 5' and shaft 4' are similar to the same components in FIG. 1.

While FIGS. 1 and 2 illustrate a preferred embodiment of the present invention, other embodiments employ other crystallizers that provide the necessary heat and mass transfer. For example, the cooling elements may be tubes instead of plates.

C. The Crystallization Process

The temperature difference between the fructose mass and cooling elements is kept less than about 6.0° C., and the supersaturation is kept less than 1.25, preferably between 1.1 and 1.2, during the whole crystallization process. The sufficient heat transfer area and mixing efficiency keeps the temperature difference between the fructose mass and cooling elements small enough despite very short crystallization times. The supersaturation which determines the cooling rate is calculated during the crystallization as follows:

$$Y = \frac{10000 \times (Ct - Cml)}{Ct \times 100 - Cml)}$$

$$Qml = 100 \times \left[\frac{Qt - Y}{100 - Y}\right]$$

$$Cml = F(Qml, Tm)$$

$$S = \frac{Cml \times (100 - Cml')}{Cml' \times (100 - Cml)}$$

$Y$ = crystal yield, % of dry substance amount $Ct$ = total dry substance concentration, % w/w $Cml$ = measured mother liquid concentration, % w/w $Qml$ = mother liquid purity, % w/w of dry substance $Cml'$ = saturation concentration of the mother liquid, % w/w $F$ = experimentally measured solubility function $Tm$ = temperature of the mass, ° C.

$S$ = supersaturation $Qt$ = feed purity, % w/w of dry substance

The mother liquid concentration and temperature are measured by, for example, an on-line refractometer and a suitable thermometer. The total dry substance concentration of the mass and the purity of the feed liquid are obtained from laboratory analyses. The solubility of fructose in water is a function of purity and temperature and is obtained experimentally.

The aqueous feed solution contains glucose as a major impurity, and it contains not less than 90% by weight fructose relative to the total weight of dry solids. The dry solids concentration of the mass must be higher than 90 w/w % to get a reasonable yield if the final temperature of cooling is about 25° C. The pH adjustment of the feed syrup is not necessary because of short crystallization times but the optimum pH range of the feed syrup is 4.5–5.5 to minimize the degradation of fructose.

The careful supersaturation control, combined with efficient heat transfer and effective mixing, results in maximal crystal growth rates without spontaneous crystal formation during the entire crystallization process. The productivity of 0.5–0.8 t/m$^3$/d achieved in the main crystallization by this improved method is substantially higher than the productivity obtained using the most advantageous method presented in the prior art.

In the preferred embodiment, the fructose solution is placed in the crystallizer after being evaporated to a concentration of greater than about 90% (w/w) dry solids and adjusted to the seeding temperature. During this pre-crystallization phase, the seeding is made and the cooling program is determined as set forth above. Following this stage, a portion of the mass is withdrawn, leaving a crystalline "foot" which serves as the seed in the following main crystallization. Additional, concentrated feed is added and the cooling program continued once again as set out above. After the main crystallization the crystals are separated from the other liquid by centrifugation and then dried.

In another embodiment, the crystal foot is used ini another crystallizer which is filled with additional syrup.

EXAMPLES 1–6

Intermediate Scale Crystallization Parameters

Both the pre- and main crystallization experiments were done with the 6 liter pilot crystallizer shown in FIG. 2 equipped with cooling water jacket and effective mixer. The crystallizer was connected with a programmable thermostat Mgw Lauda RKP 20. The length of the crystallizer was 18 cm and the diameter was 21 cm. The crystallizer has 42 m$^2$/m$^3$ heat transfer area, and it was slightly inclined.

The crystallizer consists of two crystallization zones, the width of which were 8 cm, and two mixing blades were installed in both zones. The distance between the mixer blades and cooling plates was about 1.5 cm. The rotation speed of the mixer was 11 rpm and the velocity of the top of mixer blades was 130 mm/sec during the examples.

The feed syrup was obtained from an industrial plant and it consisted of 95.5% fructose, 1.0% dextrose, 2.2% oligosaccharides and the rest being mainly salts as analyzed by HPLC. This syrup, which had poor crystallizing properties, was chosen to demonstrate the effectiveness of the present invention. The pH of the feed syrup was 4.1, and it was adjusted to about 5.0 in all examples except No. 4.

The seed crystals were made from commercial fructose crystals by grinding with Fritsh pulverisette type 14.702. The mean particle size of the seed crystals was about 0.03 mm and 90% of the crystals were between 0.02–0.08 mm as analyzed by a PMT-PAMAS particle measuring and analyzing system. The crystallization parameters of the examples are set forth in Table 1 and the results are listed in Table 2.

TABLE 1

| | | Ex. 1 | | Ex. 2 | | Ex. 3 | | Ex. 4 | | Ex. 5 | | Ex. 6 | |
|---|---|---|---|---|---|---|---|---|---|---|---|---|---|
| The Crystallization Parameters | | | | | | | | | | | | | |
| | | pre | main | pre | main | pre | main | pre | main | pre | main | pre | main |
| a | | 91.0 | 92.6 | 90.9 | 92.0 | 91.3 | 93.3 | 91.3 | 91.8 | 90.9 | 92.4 | 91.0 | 92.2 |
| b | | 8.1 | 8.2 | 8.1 | 7.9 | 8.2 | 8.6 | 8.1 | 8.4 | 7.9 | 7.8 | 8.2 | 8.8 |

TABLE 1-continued

The Crystallization Parameters

| | Ex. 1 | | Ex. 2 | | Ex. 3 | | Ex. 4 | | Ex. 5 | | Ex. 6 | |
|---|---|---|---|---|---|---|---|---|---|---|---|---|
| | pre | main | pre | main | pre | main | pre | main | pre | main | pre | main |
| c | .014 | 17.7 | .038 | 14.2 | .038 | 9.7 | .038 | 10.8 | .036 | 15.5 | .038 | 10.3 |
| d | 56.5 | 57.0 | 56.0 | 57.0 | 57.0 | 57.0 | 56.0 | 56.5 | 56.0 | 57.0 | 56.0 | 57.0 |
| e | 35.5 | 28.0 | 36.0 | 28.0 | 40.0 | 28.0 | 37.0 | 24.5 | 35.0 | 28.0 | 37.0 | 25.0 |
| f | 24 | 21 | 26 | 24 | 24 | 15 | 24 | 20 | 72 | 24 | 24 | 30 |
| g | 5.0 | | 5.1 | | 5.0 | | 4.1 | | 5.0 | | 4.9 | | a concentration of the mass, % w/w
b amount of the mass, kg
c amount of the seed crystals or crystal foot, % w/w of dry substance
d initial temperature of the crystallization, ° C.
e final temperature of the crystallization, ° C.
f crystallization time, h
g pH of the feed syrup In Example 1, the fructose solution was first adjusted to pH 5.0 with 5% w/w $NaHCO_3$ solution. The feed syrup was evaporated to 91.0% w/w and 8.1 kg of it was transferred to the crystallizer which temperature was 56.5° C. When the crystallizer was filled, the syrup was seeded with 0.014% seeds and the cooling program of the pre-crystallization was started. The concentration of the mother liquid was measured with a laboratory refractometer, and the mass was cooled to 35.5° C. so that the calculated supersaturation maintained was less than 1.25. The duration of the crystallization was 24 h, and the yield was 44.3% in the end of the crystallization.

When the pre-crystallization was finished, a part of the mass was pulled off and the rest was left in the crystallizer so that fructose yield of the crystal foot, which determines the crystal size of the product, in the beginning of the main crystallization was 17.7% of dry substance. The crystallizer was filled with evaporated feed syrup which was mixed with the crystal foot so that the temperature gradually rose to 57° C. and the dry substance concentration rose to 92.6%. The cooling program was started when the crystallizer was filled. The mass was cooled to 28° C. so that the supersaturation was maintained at less than 1.25. The duration of the main crystallization was 21 h.

After the main crystallization, the crystals were separated from the mother liquid and washed by a laboratory centrifugal Hettich Roto Silenta 2. The diameter of the centrifugal basket was 21 cm and the amount of the washing water was 1.5–2.5% on the weight of the mass. The crystals were dried by a laboratory fluidization dryer.

The crystal yield was 56.6% of dry substance in the end of the crystallization, and the purity of the crystals was 99% of the dry substance. The mean size of the product was 0.49 mm and the standard deviation from the mean size was 47% as measured by a sieve analysis.

The crystallization procedures as set forth in the remaining examples all had the same operation stages of EXAMPLE 1. The variables were measured during the experiments as described in Tables 2 to 7. The time from the beginning of the cooling in the main crystallization, the cooling water temperature, the concentration and supersaturation of the mother liquid are listed. In each case, the concentration was measured by a laboratory refractometer. The temperature difference between the cooling water and the mass was less than 1.0° C.

Example 1

TABLE 2

Variables in Test Run #1

| pre cryst. | | | | main cryst. | | | |
|---|---|---|---|---|---|---|---|
| Time h | Temp ° C. | Conc w/w % | s | Time h | Temp ° C. | Conc w/w % | s |
| 0.0 | 56.5 | 91.0 | 1.16 | 0.0 | 57.0 | 91.2 | 1.15 |
| 12.9 | 52.2 | 90.5 | 1.23 | 0.5 | 57.0 | 91.1 | 1.15 |
| 14.1 | 51.1 | 90.2 | 1.23 | 11.3 | 50.5 | 88.5 | 1.03 |
| 15.6 | 49.7 | 89.6 | 1.20 | 12.5 | 50.0 | 88.3 | 1.02 |
| 16.6 | 48.8 | 89.4 | 1.20 | 14.3 | 46.9 | 88.1 | 1.08 |
| 17.5 | 48.0 | 89.2 | 1.20 | 15.9 | 44.3 | 87.7 | 1.11 |
| 18.5 | 47.0 | 88.7 | 1.16 | 23.0 | 28.0 | 84.5 | 1.13 |
| 20.3 | 42.9 | 88.3 | 1.23 | | | | |
| 24.9 | 35.5 | 84.9 | 1.05 | | | | |

Example 2

TABLE 3

Variables in Test Run #2

| pre cryst. | | | | main cryst. | | | |
|---|---|---|---|---|---|---|---|
| Time h | Temp ° C. | Conc w/w % | s | Time h | Temp ° C. | Conc w/w % | s |
| 0.0 | 56.0 | 90.9 | 1.17 | 0.0 | 57.0 | 90.8 | 1.11 |
| 0.5 | 56.0 | 90.9 | 1.17 | 0.5 | 57.0 | 90.4 | 1.06 |
| 4.1 | 54.0 | 90.9 | 1.24 | 1.6 | 56.2 | 90.3 | 1.07 |
| 10.7 | 54.1 | 90.2 | 1.14 | 2.5 | 55.5 | 90.0 | 1.05 |
| 22.0 | 42.9 | 87.7 | 1.16 | (42.7 | 28.0 | 83.2 | 1.02) |
| 23.5 | 39.8 | 87.0 | 1.15 | | | | |
| 24.5 | 37.8 | 86.4 | 1.14 | | | | |
| 26.0 | 36.0 | 85.6 | 1.10 | | | | |
| 26.8 | 36.0 | 85.2 | 1.07 | | | | |
| 24.9 | | | | | | | |

Example 3

TABLE 4

Variables in Test Run #3

| | pre cryst. | | | | main cryst. | | |
|---|---|---|---|---|---|---|---|
| Time h | Temp °C. | Conc w/w % | s | Time h | Temp °C. | Conc w/w % | s |
| 0.0 | 57.0 | 91.3 | 1.21 | 11.2 | 41.0 | 87.2 | 1.12 |
| 3.6 | 56.5 | 91.1 | 1.18 | 12.5 | 37.0 | 86.0 | 1.09 |
| 18.0 | 49.3 | 88.9 | 1.12 | 13.0 | 35.4 | 85.7 | 1.09 |
| 19.2 | 48.0 | 88.9 | 1.15 | 14.6 | 30.7 | 84.8 | 1.10 |
| 20.1 | 46.9 | 88.5 | 1.14 | 15.5 | 28.2 | 84.5 | 1.13 |
| 21.4 | 44.7 | 87.6 | 1.10 | | | | |
| 22.7 | 42.3 | 86.9 | 1.08 | | | | |
| 24.1 | 39.9 | 86.5 | 1.10 | | | | |

Example 4

TABLE 5

Variables in Test Run #4

| | pre cryst. | | | | main cryst. | | |
|---|---|---|---|---|---|---|---|
| Time h | Temp °C. | Conc w/w % | s | Time h | Temp °C. | Conc w/w % | s |
| 0.0 | 56.0 | 91.3 | 1.23 | 14.6 | 39.6 | 86.8 | 1.13 |
| 0.5 | 56.3 | 91.0 | 1.17 | 15.6 | 37.7 | 86.2 | 1.12 |
| 3.2 | 55.8 | 90.0 | 1.19 | 16.5 | 35.5 | 85.7 | 1.12 |
| 20.5 | 45.1 | 87.4 | 1.07 | 17.5 | 32.8 | 85.2 | 1.12 |
| 21.9 | 42.4 | 86.9 | 1.01 | 18.5 | 29.9 | 85.1 | 1.18 |
| 23.2 | 39.7 | 86.6 | 1.11 | 19.5 | 27.0 | 84.5 | 1.17 |
| 24.5 | 37.2 | 85.7 | 1.09 | 20.0 | 24.5 | 83.8 | 1.16 |

Example 5

TABLE 6

Variables in Test Run #5

| | pre cryst. | | | | main cryst. | | |
|---|---|---|---|---|---|---|---|
| Time h | Temp °C. | Conc w/w % | s | Time h | Temp °C. | Conc w/w % | s |
| 0.0 | 56.0 | 90.9 | 1.17 | 0.0 | 57.0 | 91.1 | 1.15 |
| 5.5 | 55.5 | 90.9 | 1.18 | 1.3 | 56.2 | 90.5 | 1.09 |
| 70.6 | 36.1 | 85.3 | 1.07 | 16.8 | 43.0 | 87.3 | 1.09 |
| | | | | 19.0 | 39.5 | 86.5 | 1.09 |
| | | | | 21.9 | 33.3 | 85.1 | 1.09 |
| | | | | 24.0 | 28.9 | 84.4 | 1.11 |

Example 6

TABLE 7

Variables in Test Run #6

| | pre cryst. | | | | main cryst. | | |
|---|---|---|---|---|---|---|---|
| Time h | Temp °C. | Conc w/w % | s | Time h | Temp °C. | Conc w/w % | s |
| 0.0 | 56.0 | 91.0 | 1.18 | 0.0 | 57.0 | 90.5 | 1.07 |
| 0.8 | 55.9 | 90.8 | 1.17 | 14.5 | 39.8 | 87.0 | 1.14 |
| 18.8 | 47.1 | 87.9 | 1.07 | 15.4 | 38.0 | 86.0 | 1.08 |
| 22.1 | 41.9 | 86.8 | 1.09 | 16.4 | 35.6 | 85.4 | 1.08 |
| 22.8 | 40.5 | 86.4 | 1.08 | 18.1 | 30.7 | 84.6 | 1.10 |
| 23.9 | 38.2 | 85.9 | 1.08 | 18.8 | 28.9 | 84.3 | 1.11 |
| 24.5 | 37.0 | 85.7 | 1.09 | 20.0 | 25.3 | 83.7 | 1/12 |

TABLE 8

Results of Test Runs in Examples 1–6

| | Ex. 1 | | Ex. 2 | | Ex. 3 | | Ex. 4 | | Ex. 5 | | Ex. 6 | |
|---|---|---|---|---|---|---|---|---|---|---|---|---|
| | pre | main | pre | main | pre | main | pre | main | pre | main | pre | main |
| a | 44.3 | 56.6 | 40.5 | 57.5 | 38.8 | 62.8 | 42.6 | 54.5 | 41.9 | 58.8 | 40.9 | 57.8 |
| b | — | — | — | — | — | 60.6 | — | 56.2 | — | 58.7 | — | 57.1 |
| c | 0.17 | 0.49 | 0.16 | 0.62 | 0.16 | 0.66 | 0.13 | 0.35 | 0.19 | 0.62 | 0.13 | 0.37 |
| d | | 47 | | 31 | | 27 | | 59 | | 38 | | 57 |
| e | | 99 | | 99.5 | | 99.9 | | — | | 99.9 | | — |
| f | 0.52 | 0.75 | 0.46 | 0.70 | 0.48 | 0.90 | 0.52 | 0.71 | 0.17 | 0.67 | 0.50 | 0.78 | a crystal yield in the end of the pre crystallization and before centrifuging in the main crystallization, % w/w of dry substance
b crystal yield of the product, % w/w of dry substance
c mean size of the product, mm
d standard deviation from the mean size of the product, %
e purity of the product, % w/w of dry substance
f productivity, t/m³/day The mean size and the standard deviation of the product were measured by the sieve analysis and in the end of the pre-crystallization by a laboratory microscope.

Example 7.

Approximately 18,000 kg of crystalline fructose were recovered in 30 hours by crystallizing fructose from solution in a 30 cubic meter cylindrical crystallizer which was inclined approximately 5°. The crystallizer was quipped with efficient cooling and mixing elements. The heat transfer area was 5.8 m$^2$/m$^3$ and the rotation velocity at the end of the mixing elements was between about 130 and 260 mm/sec.

A 5 cubic motor of seed crystal foot (the dry substance content of which was 90.1 weight percent, 97 weight percent of the dry substance was fructose, and the foot had and mean crystal size about 0.2 m) was placed in the crystallizer, Next, concentrated fructose syrup, 92 weight percent dry substance of which about 97 weight percent was fructose, was added to the crystallizer and mixed with the foot. When the crystallizer was filled, the temperature of the mass in the crystallizer was adjusted to about 56° C. A crystal yield about 5–10% of dry substance ("d.s.") was obtained.

The mass war then cooled to 30° C. over 30 hours at a moan rate of 0.87° C./hr. During cooling, the mean temperature difference (W) in the solution ranged between about 0 and 10° C. following table:

Time, h: (0) 2 5 10 17 20 24 27 30

MTD, ° C.: (0) 2 6 8 4 7 3 7 5

After cooling, the crystals were separated and washed by a conventional centrifuge, dried in a drum dryer, sieved and packed. The fructose yield after cooling was about 58% of the dry substance. The product yield was over 46% of dry substance with a mean crystal size of about 0.53 mm and standard deviation of the mean size of 29%. Fructose content of the crystals was over 99%.

Example 8

A 5 cubic meter seed crystal foot was put in the crystallizer. The foot had a dry substance content of about 90 weight percent, 97 percent of the dry substance was fructose and the foot had mean crystal size about 0.20 mm.

Next, concentrated fructose syrup, of which 92 weight percent was dry substance and 97 percent of the dry substance was fructose, was added to the crystallizer. Thereafter, the fructose syrup was mixed with the foot. The crystallizer and rotation velocity of the mixer were same as that stated in Example 7. After mixing, the mass in the crystallizer had a temperature of 54° C. and a crystal yield of about 20% of d.s.

The fructose syrup and foot admixture was cooled from 54° C. to 29° C. over the course of 30 hours (i.e., at a mean rate of 0.83 OC/h). The mean temperature difference of the solution varied between about 1 and 7° C. The following table shows the recorded temperature differences (MTD) during the cooling period:

Time, h: 1 3 6 12 13 14 18 20 22 24 27 30

MTD, ° C.: 1 5 3 6 7 6 7 6 4 6 3 6

After cooling the crystals were separated and washed in a conventional centrifugal, dried by a drum dryer, sieved and packed. Fructose yield after cooling was about 56% of the dry substance. The product yield was about 46% of dry substance, mean crystal size was over 0.50 mm with a standard deviation of the mean size of about 25%. Fructose content of the crystal was greater than 99%.

Example 9

A 5 cubic meter seed crystal foot having a dry substance content of about 90 weight percent of which about 97 percent was fructose, and mean crystal size about 0.20 mm, was placed in a 30 cubic meter crystallizer. Thereafter, concentrated fructose syrup was added to, and mixed with, the foot. When the crystallizer was filled, the mass inside had a temperature of about 56° C., a dry substance content of about 92.3 weight percent of which about 97.2 percent was fructose and crystal yield about 20% of d.s.

The rotation velocity of the mixer was as described in Example 7.

The mass in the crystallizer was cooled from about 56° C. to about 33° C. over a period of about 18 hours (i.e., at a mean rate of about 1.28° C./h). The mean temperature difference of the mass varied between about 0–12° C. and the effective difference was about 7° C. during the 18 hours cooling. The recorded mean temperature difference (MTD) during the cooling (18 h) as following:

Time, h: (0) 5 10 15 18

MTD, ° C.: (0) 12 7 6 8

After cooling the crystals were separated and washed by a traditional centrifugal, dried by a drum dryer, sieved and packed. Fructose yield in the end of the cooling was about 58 percent of the dry substance. The product yield was over 46 percent of dry substance, mean crystal size was 0.53 mm and standard deviation of the mean size 23 percent. Fructose content of the crystals was over 99 percent.

What we claim is:

1. A method for crystallizing anhydrous fructose from water comprising:
    (a) preparing an aqueous solution containing at least about 90% dry substance, the fructose content of the dry substance being at least about 90% by weight;
    (b) introducing said aqueous solution into a crystallizer having a volume of at least about 10 m$^3$; said crystallizer having a heat transfer surface of at least about 5 m$^2$/m$^3$, comprising a multiplicity of cooling elements and mixing blades therebetween, said cooling elements and mixing blades being situated in proximate relation to each other;
    (c) seeding said aqueous solution at a temperature of 50–60° C.; and
    (d) crystallizing the resulting mass by cooling under crystallization conditions including maintaining a temperature difference between the solution and the cooling elements of less than about 10° C., and maintaining supersaturation of the aqueous solution with respect to saturated fructose at a ratio between 1.1 and 1.25, whereby optimum heat transfer and a fructose crystal growth rate of at least 0.008 mm/hr is achieved with little or no spontaneous crystal nucleation.

2. The method of claim 1 further comprising recovering fructose crystals from step (d).

3. The method of claim 2 wherein said fructose crystals are recovered by centrifugation and drying.

4. The method of claim 1 wherein air bubbles are mixed into the resulting mass at a volume of no more than 20% of the volume of the mass.

5. The method of claim 1 wherein the supersaturation is maintained in the range between about 1.1. and 1.2.

6. The method of claim 1 wherein said crystallizer is horizontal or inclined at no more than 45 degrees.

7. The method of claim 1 wherein said cooling elements are spaced about 200–400 mm apart.

8. The method of claim 1 wherein said mixing blades have a rotation speed such that the velocity of the top of the mixing blades is not less than about 50 mm/sec at any point during crystallization.

9. The method of claim 6 wherein said mixing blades have a velocity of from about 100–300 mm/sec.

10. The method of claim 1 wherein said heat transfer surface of said crystallizer is no more than 10 m$^2$/m$^3$.

11. The method of claim 1 wherein said cooling elements and said mixing blades are situated within 30 mm of each other.

12. The method of claim 1 wherein said crystal growth rate is up to 0.033 mm/hr.

13. The method of claim 1 wherein said crystallization takes place at a cooling time of less than about 30 hours.

14. The method of claim 1 wherein crystallization is carried out at a rate of from 0.75–2° C./hr.

15. The method of claim 1 wherein said fructose crystals have a size of from about 0.4 to about 0.6 mm.

16. The method of claim 1 wherein said fructose crystals have a purity of greater than 99%.

17. The method of claim 1 wherein said crystallization step produces a yield of fructose crystals of no more than 65% of dry substance at a productivity rate per total volume of crystallizer of over 0.3 t/m$^3$/day of crystals.

18. A method for crystallizing anhydrous fructose from water comprising:

cooling a seeded volume of at least about 30 cubic meters of an aqueous solution saturated with fructose, with the ratio of said supersaturated fructose concentration being maintained between about 1.1 and 1.25 times the theoretical solubility of fructose and which said solution comprises at least about 90% solids on a weight basis, at least 90% of which is fructose, from an initial temperature of about 50–60° C. at a controlled rate of less than about 2.5° C./hr effective to cool said solution to produce anhydrous fructose in less than about 30 hours and with continuous effective axial mixing such that the temperature gradient between the solution and the cooling means is less than about 10° C., wherein said cooling is accomplished in a crystallizer having a heat transfer surface of about 5 m$^2$/m$^3$ or greater.

19. A method for crystallizing anhydrous fructose from water in a large scale crystallizer of about 10 to 50 m$^3$ in volume over a cooling time of 15–30 hours, said crystallizer having a heat transfer surface of at least about 5 m$^2$/m$^3$, cooling elements spaced about 200-400 mm apart, with mixing blades therebetween situated in proximate relation to the cooling elements, introducing to said crystallizer an aqueous solution containing at least about 90% dry substance, the fructose content of the dry substance being at least about 90% by weight, seeding said aqueous solution at a temperature of 50–60° C., crystallizing the resulting mass by cooling under crystallizing conditions including maintaining a temperature difference between said solution and the cooling elements of less than about 10° C., and maintaining the velocity of the top of the mixer blades between about 50 to 300 mm/sec, thereby maintaining the supersaturation of the liquid solution with respect to saturated fructose at a ratio of between 1.1 and 1.25, whereby optimum heat transfer and a fructose crystal growth rate of at least 0.008 mm/hr is achieved with little or no spontaneous crystal nucleation, and recovering crystalline anhydrous fructose at a productivity (production rate of crystals (metric tons) per the total volume of the crystallizer (cubic meter)) of 0.5 to 0.8 t/m$^3$/day of crystals of mean dimension from 0.35 to 0.66 mm with a fructose purity of at least 99%.

20. The method of claim 19 wherein the mean temperature difference between the fructose mass and the cooling elements is maintained from about 1 to 7° C., and the crystallizing mass is cooled to 25–35° C. at a rate of 0.83° C./hr to 1.28° C./hr.

21. The method of claim 19 wherein said yield of crystalline anhydrous fructose is at least 56%.

22. A cylindrical crystallizer suitable for the high capacity production of crystalline fructose, said crystallizer having a heat transfer area of over about 5 m$^2$/m$^3$ and an effective means for mixing such that the temperature gradient between a solution containing fructose and the cooling means is no greater than about 10° C. and such that the supersaturation of an initial aqueous solution with respect to saturated fructose is maintained at a ratio of between about 1.1 and 1.25.

23. The crystallizer of claim 22 wherein said crystallizer is horizontal or inclined no more than about 45 degrees, and comprises a mixer and cooling means situated inside the crystallizer, said cooling means being spaced apart no more than 400 nm and having an open sector of at least 5 degrees along the crystallizer.

24. The crystallizer according to claim 23 wherein said mixer comprises blades situated between said cooling means such that the distance between said blades and the cooling means is no greater than 30 nm.

25. The crystallizer according to claim 22 wherein said mixer has a rotational speed such that the velocity of the blades is not less than 50 mm/sec during crystallization.

* * * * *

UNITED STATES PATENT AND TRADEMARK OFFICE
CERTIFICATE OF CORRECTION

PATENT NO.   : 6,206,977 B1
DATED         : March 27, 2001
INVENTOR(S)  : Juha Nurmi et al.

It is certified that error appears in the above-identified patent and that said Letters Patent is hereby corrected as shown below:

<u>Column 6,</u>
Line 23, "ini" should read -- in --

<u>Column 11,</u>
Line 12, "motor" should read -- meter --
Line 15, "m" should read -- mm --
Line 22, "war" should read -- was --
Line 23, "maon" should read -- mean --
Line 51, "OC/h" should read -- °C/h --

Signed and Sealed this

Thirtieth Day of April, 2002

Attest:

JAMES E. ROGAN
Attesting Officer
Director of the United States Patent and Trademark Office